(12) United States Patent
De Paoli et al.

(10) Patent No.: US 10,340,486 B2
(45) Date of Patent: Jul. 2, 2019

(54) CONNECTION DEVICE FOR A BATTERY

(71) Applicants: Commissariat à l'Energie Atomique et aux Energies Alternatives, Paris (FR); Zodiac Aero Electric, Montreuil (FR)

(72) Inventors: Lionel De Paoli, Odenas (FR); Edouard Bonnefous, Montreuil (FR); Julien Dauchy, Chambery (FR); Olivier Deshayes, Montreuil (FR)

(73) Assignees: Commissariat à l'Energie Atomique et aux Energies Alternatives, Paris (FR); Zodiac Aero Electric, Montreuil (FR)

( * ) Notice: Subject to any disclaimer, the term of this patent is extended or adjusted under 35 U.S.C. 154(b) by 172 days.

(21) Appl. No.: 15/314,924

(22) PCT Filed: May 27, 2015

(86) PCT No.: PCT/FR2015/051402
§ 371 (c)(1),
(2) Date: Nov. 29, 2016

(87) PCT Pub. No.: WO2015/185827
PCT Pub. Date: Dec. 10, 2015

(65) Prior Publication Data
US 2017/0187013 A1    Jun. 29, 2017

(30) Foreign Application Priority Data
Jun. 3, 2014 (FR) ...................................... 14 55011

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 2/305* (2013.01);
(Continued)

(58) Field of Classification Search
CPC ......... H01M 2/00–38; H01M 6/00–52; H01M 10/00–60; H01M 2200/00–30
(Continued)

(56) References Cited

U.S. PATENT DOCUMENTS

2007/0184339 A1    8/2007    Scheucher
2011/0293998 A1*   12/2011   Sato .................... H01M 2/1077
                                                       429/159

FOREIGN PATENT DOCUMENTS

WO    00/79619 A1    12/2000
WO    03/065483 A2    8/2003

OTHER PUBLICATIONS

PCT International Search Report; International Application No. PCT/FR2015/051402; dated Jul. 3, 2015, 2 pages.
(Continued)

*Primary Examiner* — Bach T Dinh
(74) *Attorney, Agent, or Firm* — Moreno IP Law LLC (57) ABSTRACT

A battery unit comprises a plurality of accumulators distributed in rows, a support arranged along a row of accumulators of the plurality of accumulators, conductive strips attached to the accumulators of the row and extending over the support, a guide, the support being suitable for sliding into the guide, a metal strip extending in the guide, deformable electrical connectors fixed to the metal strip and designed to come into contact with the conductive strips when the support is fully inserted in the guide, and metal portions distributed along the metal strip, in contact with the metal strip.

11 Claims, 5 Drawing Sheets

(51) Int. Cl.
*H01M 2/30* (2006.01)
*H01M 10/42* (2006.01)
(52) U.S. Cl.
CPC .... *H01M 10/4207* (2013.01); *H01M 2220/10* (2013.01); *H01M 2220/20* (2013.01)
(58) Field of Classification Search
USPC .......................................... 429/1–11, 65–255
See application file for complete search history.

(56) References Cited

OTHER PUBLICATIONS

Written Opinion of the International Searching Authority; International Application No. PCT/FR2015/051402; 6 pages.

\* cited by examiner

CONNECTION DEVICE FOR A BATTERY

CROSS-REFERENCE TO RELATED APPLICATION

The present patent application claims the priority benefit of French patent application FR12/55011 which is herein incorporated by reference.

BACKGROUND

The present disclosure relates to an electric connection device for a battery, that is, an assembly of energy storage elements, also called accumulators, connected in series and/or in parallel.

DISCUSSION OF THE RELATED ART

The series and/or parallel assembly of the accumulators of a battery enables to reach the desired electric voltage and power levels. Electronic circuits may be connected to the accumulators. The system comprising the battery of accumulators and the electronic circuits is generally called battery pack.

A battery pack is generally divided into modules, each module comprising a group of accumulators connected in parallel and/or in series. The modules are connected to one another in series and/or in parallel. The number of accumulators per module is selected, in particular, to limit the voltage across each module, for example, to a DC voltage smaller than 120 V, and to limit the bulk of each module. The modules can then be easily and safely handled by an operator.

In known fashion, the electric connections between accumulators of a module may be formed by using dedicated metal parts, electric cables, or by using the conductive tracks of printed circuits attached to the accumulators. The electric connections between modules of a battery are generally formed by using metal strips or electric cables, for example attached by screwing, riveting, or welding.

The total number of accumulators of a battery may vary within significant proportions according to the provided use of the battery. In particular, an electric vehicle battery may comprise several thousands of accumulators. Thereby, the number of modules within the battery may significantly vary.

It may be desirable to be able to extract a module from a battery, especially for maintenance operations. This may generally not be achieved simply and rapidly with known module connection devices. Indeed, either the metal connection parts or the electric cables are attached to the modules by connections which cannot be disassembled, particularly by welding, or there is a high number of parts to be assembled or disassembled.

The assembly of the modules with electric cables further has the disadvantage of being sensitive to vibrations. There then is a risk of short-circuit in the case of a breakage of an electric cable or in the case of a deterioration of the cable insulator.

The connection between modules may be formed by using power connectors. However, existing power connectors are generally designed to concentrate on an electric connection of minimum volume all the current to be transmitted. It may then be difficult to obtain a homogeneous current distribution between the accumulators of a module, which may deteriorate the lifetime and the accumulator performances.

Further, devices for connecting the modules to one another should enable an operator to safely perform assembly and disassembly operations. Indeed, live maintenance operations may be performed when it is not desirable to fully discharge the accumulators, particularly for lithium-type accumulators.

SUMMARY

An embodiment aims at overcoming all or part of the disadvantages of the use of known battery module connection devices.

An embodiment aims at decreasing the battery bulk.

An embodiment aims at homogenizing the current between the accumulators of each battery module.

An embodiment aims at a battery module assembly and disassembly method which is simple and fast.

An embodiment aims at ensuring that the assembly and disassembly operations are safe for an operator.

Thus, an embodiment provides a battery pack comprising:
a first plurality of accumulators distributed in rows;
a first support arranged along a first row of accumulators of the first plurality of accumulators;
first conductive strips attached to the accumulators of the first row and extending on the first support;
a first guide, the first support being capable of sliding in the first guide;
a first metal strip extending in the first guide;
first deformable electric connectors attached to the first metal strip and capable of coming into contact with the first conductive strips when the first support is fully inserted into the first guide; and
first metal portions distributed along the first metal strip and in contact with the first metal strip.

According to an embodiment, for each first conductive strip, the electric resistance between the first conductive strip and the first closest metal portion is substantially identical.

According to an embodiment, for each first conductive strip, the electric resistance between the first conductive strip and the first closest metal portion is identical to within 10%.

According to an embodiment, the first deformable electric connectors comprise multiple-strip electric connectors.

According to an embodiment, the first guide comprises first openings for the passage of the first portions.

According to an embodiment, the battery pack comprises a plate continued by the first portions.

According to an embodiment, the battery pack further comprises:
second conductive strips attached to the accumulators of a second row of accumulators of the first plurality of accumulators;
a second metal strip;
second deformable electric connectors attached to the second metal strip and capable of coming into contact with the second conductive strips.

According to an embodiment, the battery pack further comprises:
a second support arranged along the second row of accumulators, the second conductive strips extending on the second support;
a second guide, the second support being capable of sliding in the second guide, the second metal strip extending in the second guide, the second deformable electric connectors being capable of coming into contact with the second conductive strips when the second support is fully inserted into the second guide; and second metal portions distributed along the second metal strip and in contact with the second metal strip.

According to an embodiment, the first support comprises first and second opposite surfaces, the first row of accumulators being arranged on the first surface and the second row of accumulators being arranged on the second surface, the first conductive strips extending on the first surface and the second conductive strips extending on the second surface, the second metal strip extending in the first guide, the second deformable electric connectors being capable of coming into contact with the second conductive strips when the first support is fully inserted into the first guide, each first metal portion comprising a first metal layer in contact with the first metal strip and a second metal layer in contact with the second metal strip.

According to an embodiment, the battery pack further comprises:
a second plurality of accumulators distributed in rows;
a third support arranged along a third row of accumulators of the second plurality of accumulators;
third conductive strips attached to the accumulators of the third row and extending on the third support;
a third guide, the third support being capable of sliding in the third guide;
a third metal strip extending in the third guide;
third deformable electric connectors attached to the third metal strip and capable of coming into contact with the third conductive strips when the third support is fully inserted into the third guide; and
third metal portions distributed along the third metal strip and in contact with the third metal strip.

According to an embodiment, the first metal portions are connected to the third metal portions so that the resistance between each accumulator of the first row and the accumulator of same rank of the third row is identical to within 10%.

According to an embodiment, the battery pack further comprises:
a fourth support arranged along a fourth row of accumulators of the second plurality of accumulators;
fourth conductive strips attached to the accumulators of the fourth row and extending on the fourth support;
a fourth guide, the fourth support being capable of sliding in the fourth guide;
a fourth metal strip extending in the fourth guide;
fourth deformable electric connectors attached to the fourth metal strip and capable of coming into contact with the fourth conductive strips when the fourth support is fully inserted into the fourth guide; and
fourth metal portions distributed along the fourth metal strip and in contact with the fourth metal strip.

According to an embodiment, the second portions are connected to the fourth portions so that the resistance between each accumulator of the second row and the accumulator of same rank of the fourth row is identical to within 10%.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

The same elements have been designated with the same reference numerals in the different drawings, which have been drawn out of scale. Further, only those steps and elements which are useful to the understanding of the described embodiments have been shown and detailed. In particular, the structure of the accumulators has not been illustrated, the embodiments being compatible with usual accumulators. Further, the forming of the electronic circuits connected to the accumulators has not been detailed either, the described embodiments being here again compatible with usual electronic circuits intended for battery packs. Further, reference is made to positions (upper, lower lateral, etc.) arbitrarily based on the orientation of the drawings. In the following description, when a first part is said to be attached to a second part, this means that there is a rigid connection between the first part and the second part, the first part being capable of being in direct connect with the second part or being capable of being connected to the second part by a third part interposed between the first part and the second part.

Figure 1:
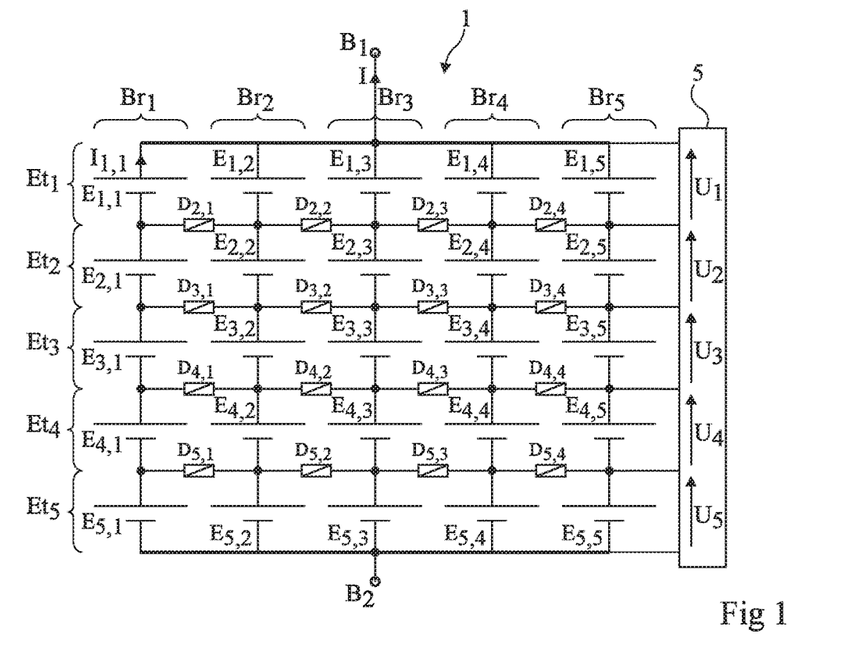
FIG. 1 shows a simplified equivalent electric diagram of a battery pack module.

FIG. 1 shows a simplified equivalent electric diagram of a battery pack module 1. A battery pack may comprise a plurality of modules 1 connected to one another in series and/or in parallel.

Module 1 comprises M*N accumulators $E_{i,j}$ distributed in M stages, or rows, $Et_i$ and N branches $Br_{j,i}$ being an integer varying from 1 to M and j being an integer varying from 1 to N. In the present example, M and N are equal to 5. The accumulators may be lithium-ion accumulators. The accumulators of a same branch are series-connected, the negative terminal of accumulator $E_{i,j}$ being connected to the positive terminal of accumulator $E_{i+1,j}$. Module 1 further comprises at least one electronic circuit 5 which may be connected to accumulators $E_{i,j}$, especially to monitor the proper operation thereof. As an example, electronic circuit 5 may be capable of measuring voltage $U_i$ across the accumulators of a same stage $Et_i$.

Circuit breakers $D_{i,j}$, for i varying between 2 and M and j varying between 1 and N−1, may be provided between the accumulators. As an example, each circuit breaker $D_{i,j}$ is connected between a node common to accumulators $E_{i,j}$ and $E_{i+1,j}$ and a node common to accumulators $E_{i,j+1}$ and $E_{i+1,j+1}$. However, the layout of circuit breakers $D_{i,j}$ may be different from that shown in FIG. 1.

In operation, the positive terminals of the accumulators of stage $Et_1$ are interconnected and form a first terminal $B_1$ of the module and the negative terminals of the accumulators of stage $Et_N$ are interconnected and form a second terminal $B_2$ of the module.

Figure 2:
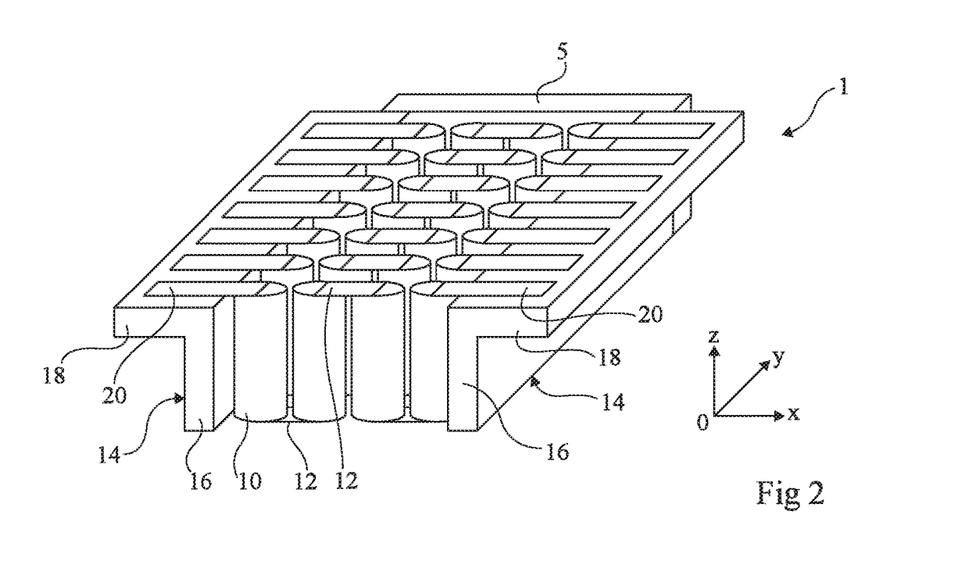
FIG. 2 is a partial simplified perspective view of an embodiment of a battery pack module.

FIG. 2 shows a perspective view of an embodiment of module 1 of a battery pack corresponding to the electric diagram shown in FIG. 1, M being equal to 4 and N being equal to 7. In FIG. 2, the accumulators are shown by cylindrical elements 10 capable of having a diameter varying from a few millimeters to several centimeters and a height varying from a few millimeters to several tens of centimeters. Further, circuit breakers $D_{i,j}$ and the elements of connection between electronic board 5 and accumulators 10 are not shown in FIG. 2. As an example, the branches extend along a direction (Ox), the stages extend along direction (Oy), and the axis of each accumulator 10 is oriented along a direction (Oz). As an example, direction (Oz) is vertical and plane (Oxy) is a horizontal plane. As a variation, direction (Oz) is horizontal and plane (Oxy) is a vertical plane.

In the present embodiment, the connections between accumulators 10 are formed by metal connection parts, for example corresponding to metal strips 12. Metal strips 12 may be attached to accumulators 10, for example, by screwing, riveting, or welding. Accumulators 10 of the module are held between two supports 14. Each support 14 for example has an L-shaped cross-section in a plane parallel to plane (Oxz) and comprises a holding portion 16 and a sliding portion 18 substantially at a right angle. Holding portion 16 extends substantially parallel to plane (Oyz) along a stage of accumulators 10 and sliding portion 18 extends substantially parallel to plane (Oxy). Each support 14 may correspond to a monoblock part made of a dielectric material, for example, polyetheretherketone (PEEK).

Conductive strips 20, for example, metallic, connect accumulators 10 of the first or of the last stage of module 1 to the adjacent support 14. Each conductive strip 20 is attached to a terminal of an accumulator and to sliding portion 18 of the adjacent support. As an example, each conductive strip 20 is made of a material having a low ohmic contact, for example, a high resistance to corrosion and a good conductivity, for example, steel.

Figure 3:
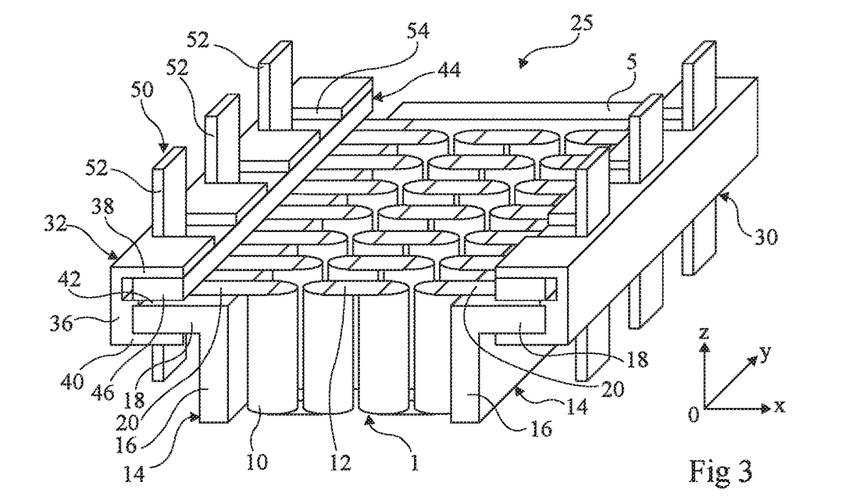
FIG. 3 shows a partial simplified perspective view of a battery pack comprising the module of FIG. 1 and an embodiment of a module connection device.
Figure 4:
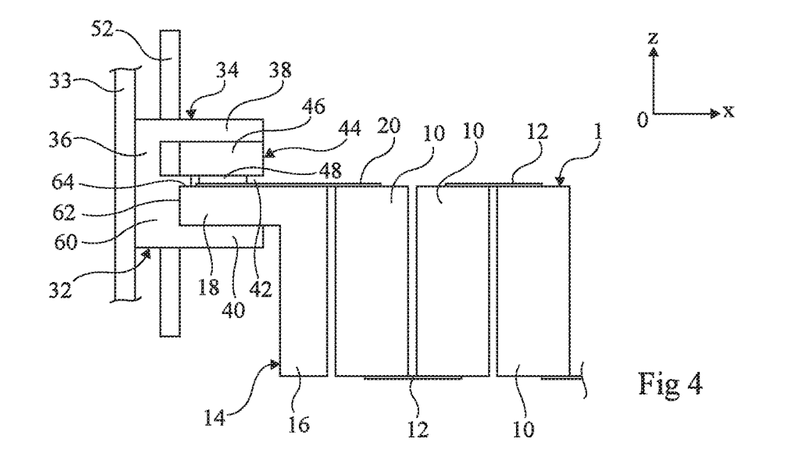
FIG. 4 is a partial simplified side view of the battery pack shown in FIG. 3.

FIG. 3 shows an embodiment of a battery pack 25 comprising module 1 shown in FIG. 2 and an embodiment of device 30 for connecting module 1 and FIG. 4 is a side view, along direction (Oy), and a partial cross-section view of a portion of battery pack 25 of FIG. 3.

Connection device 30 comprises two guiding and connection elements 32, each extending parallel to direction (Oy). Guiding and connection elements 32 are attached to a support frame 33 of battery pack 25, not shown in FIG. 3 and schematically shown in FIG. 4.

In operation, each guiding and connection element 32 is intended to cooperate with sliding portion 18 of one of supports 14. Each guiding and connection element 32 comprises a guide 34 capable of corresponding to a monoblock structure or of comprising a plurality of parts attached to one another. As an example, each guide 34 is made, for example, of polyetheretherketone (PEEK). Guide 34 comprises a bottom 36 and two lateral portions 38, 40 which delimit a groove 42 extending along direction (Oy).

Figure 5:
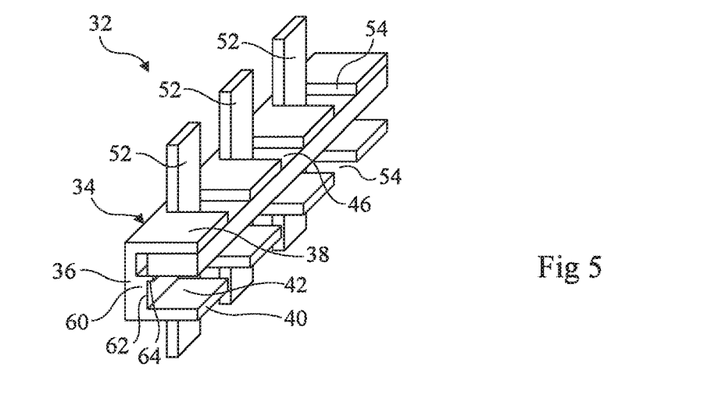
FIG. 5 is a partial simplified perspective view of a guide of the battery pack connection device shown in FIG. 5.

FIG. 5 is a perspective view of one of guides 32. Guide 34 comprises an electric connection part 44 comprising a metal strip 46 which extends parallel to direction (Oy) all along the length of guide 32. Metal strip 46 is located in groove 42 and is attached to lateral portion 38. Preferably, strip 46 is a material having a low ohmic contact, a high resistance to corrosion and a good conductivity, for example, silver-plated copper, silver-plated brass, silver-plated annealed aluminum, or nickel-plated copper. The thickness of strip 46 may vary from a few micrometers to several millimeters. Electric connection part 44 further comprises flexible electric connectors 48, shown in FIG. 4, attached to metal strip 46. These for example are multiple-strip electric connectors. Connectors 48 come into contact with conductive strips 20 when module 1 is fully inserted into guiding and connection elements 32. As an example, multiple-strip connectors 48 may be distributed all along the length of metal strip 46 along direction (Oy). As a variation, multiple-strip connectors 48 may only be provided at the locations of conductive strips 20 when module 1 is fully inserted into guiding and connection elements 32.

Electric connection part 44 further comprises a connection element 50 which, in the present embodiment, comprises metal portions 52, for example having the shape of strips each extending parallel to direction (Oz) and which are in electric contact with metal strip 46. Guide 32 comprises openings 54 for the passage of metal portions 52. As an example, each metal portion 52 is made of a material having a low ohmic contact, a high resistance to corrosion, and a good conductivity, for example, silver-plated copper, silver-plated brass, silver-plated annealed aluminum, or nickel-plated copper. The thickness of each metal portion 52 may vary from a few micrometers to several millimeters. Guide 32 comprises openings 54 provided in lateral portions 38, 40 for the passage of metal portions 52. Metal portions 52 are attached to bottom 36 of guide 32, for example, by screwing. Metal portions 52 may project on either side of guide 32. Metal portions 52 enable to electrically connect battery pack 25 to another battery pack or to a power connector forming a terminal of battery pack 25. Preferably, metal portions 52 are regularly distributed along metal strip 46. The number of metal portions 52 connected to a conductive strip 20 is smaller than or equal to number N of conductive strips 20 connected to the accumulators 10 of the first or last stage of module 1. According to an embodiment, the number of metal portions 52 is smaller than or equal to N/2. Preferably, the number of metal portions 52 is greater than or equal to N/4.

According to the present embodiment, guide 32 comprises in groove 42 elements 60 protruding from bottom 36. Each protruding element 60 delimits two surfaces 62, 64 which form stops. Surface 62 is parallel to plane (Oyz) and surface 64 is parallel to plane (Oxy). The surfaces 62 of the two guides 34 form stops for module 1 in a displacement of module 1 along direction (Ox). Surface 64 is parallel to direction (Oy) and enables to protect multiple-strip connectors 48 against a crushing by supports 14. Protruding elements 60 may be present all along the length, measured along direction (Oy), of guiding and connection element 32 with an interruption at the level of openings 54 for the passage of metal portions 52.

Figure 6:
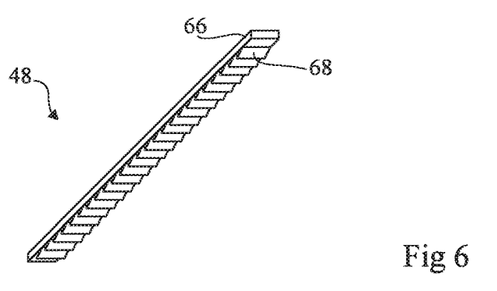
FIGS. 6 and 7 respectively are a partial simplified perspective and side view of a strip connector of the connection device shown in FIG. 5.
Figure 7:
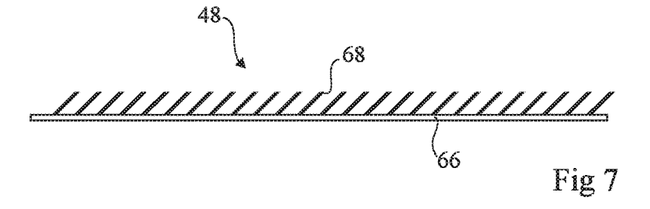

FIGS. 6 and 7 show an embodiment of a multiple-strip connector 48. The connector comprises a metal base 66 having deformable strips 68 attached thereto. Base 66 may be confounded with metal strip 46 or be placed on metal strip 46. Strips 68 may be inclined with respect to base 66. As an example, the number of strips per centimeter of connector 48 varies from 1 to 10. Strips 68 may be attached to base 66, for example, by riveting or screwing or by providing a groove having its base housing a portion with a shape complementary to that of the strip.

The current is transmitted to accumulators 10 of the first or last stage of module 1 via metal portions 52, metal strip 46, multiple-strip connectors 48, and conductive strips 20. Advantageously, the electric resistance between each conductive strip 20 and the closest metal portion 52 is substantially identical, that is, identical to within 25%. Preferably, the electric resistance between each conductive strip 20 and the closest metal portion 52 is identical to within 10%. This enables to obtain a substantially homogeneous distribution of the current flowing through metal portions 52 between accumulators 10.

The number of metal portions 52 may be greater than what would have been sufficient with respect to the electric power level to be transmitted. However, the fact of providing a sufficiently large number of metal portions 52 and of distributing them, preferably substantially regularly, along metal strip 46 enables to obtain substantially the same electric resistances between conductive strips 20 and the associated metal portions 52, and thus a substantially homogeneous distribution of the current between accumulators 10 of the first or last stage of module 1.

According to an embodiment of a method of assembling the battery pack, module 1 is inserted into grooves 42 of guiding and connection elements 32 from an end of the guiding elements and is pushed to the opposite end of guiding and connection elements 32. The strips of multiple-strip connectors 48 are then compressed by conductive strips 20 of module 1. This provides an electric connection of good quality between conductive strips 20 and multiple-strip connectors 48. According to an embodiment of a method of disassembling the battery pack, module 1 is slid in grooves 42 of guiding and connection elements 32 until it is totally removed from guiding and connection elements 32. The battery pack assembly and disassembly operations can thus be performed simply and rapidly.

Means may be provided on module 1 and/or guiding and connection elements 32 so that an operator properly directs module 1 with respect to guiding and connection elements 32.

Further, means may be provided to allow the automatic connection of electronic board 5 to a processing unit when module 1 is totally inserted into guiding and connection elements 32.

Further, the electric connection between multiple-strip connectors 48 and conductive strips 20 is automatically performed by the insertion of module 1 into guides 32. An operator thus does not have to handle metal parts on line during battery pack assembly and disassembly operations. The assembly and disassembly operations can thus be carried out safely. Further, the use of multiple-strip connectors 48 allows a homogeneous current transmission across the entire width of each conductive strip 20.

Figure 8:
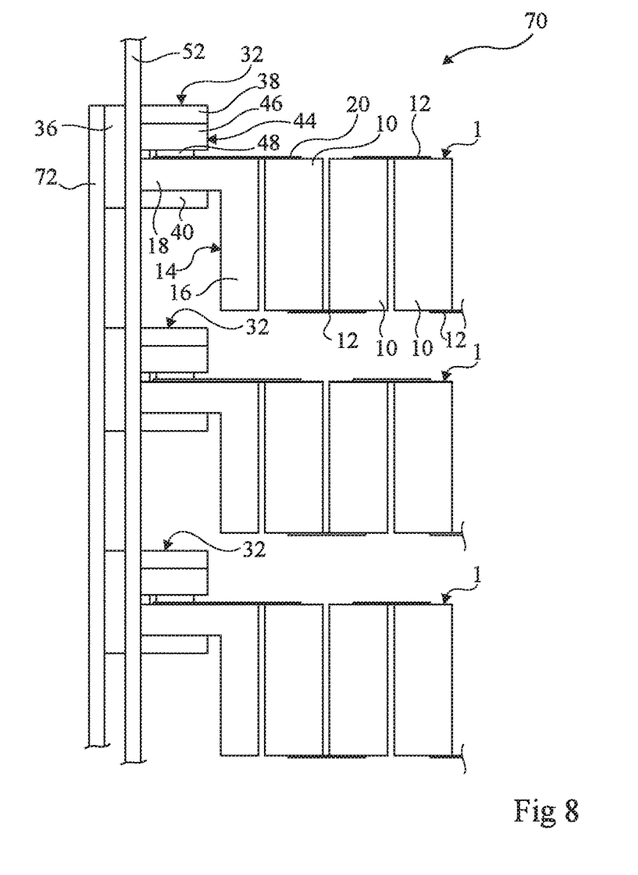
FIG. 8 is a partial simplified cross-section view of another embodiment of a battery pack.

FIG. 8 partially and schematically shows another embodiment of a battery pack 70 where three modules 1, partially shown, are connected in parallel. The cross-section plane of FIG. 8 is in a plane parallel to plane (Oxz) and running through one of metal portions 52. In FIG. 8, three guiding and connection elements 32 assembled on a frame 72 have been shown. In this embodiment, metal portions 52 are common to the three guiding and connection elements 50.

Battery pack 70 enables to electrically connect the accumulators of the first or last row of a first module with the accumulators of the first or last row of a second module. Advantageously, the electric resistance between each accumulator of the first or last row of the first module and the accumulator at the same position (at the same rank) in the first or last row of the second module is identical to within 10%. This provides a substantially homogeneous distribution of the current between the accumulators 10 of the end rows of the first and second modules.

Figure 9:
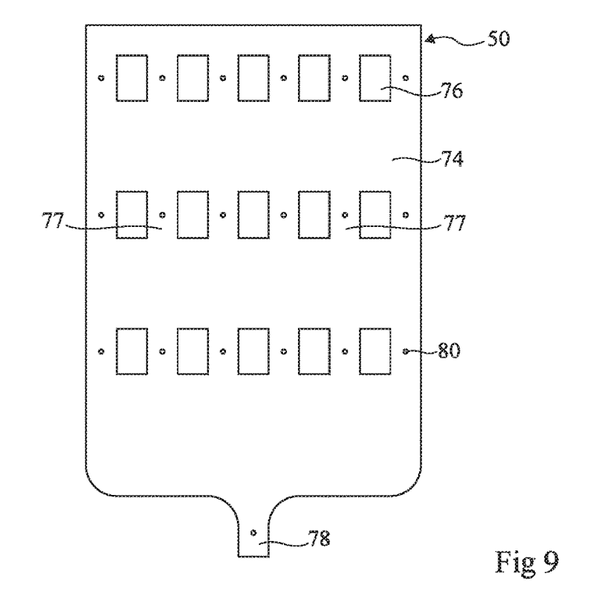
FIGS. 9 and 10 are partial simplified front views of embodiments of a connection element capable of being used to form the battery pack shown in FIG. 8.

FIG. 9 shows another embodiment of connection element 50 where connection element 50 comprises a plate 74 crossed by a plurality of rows of openings 76. Each row of openings 76 is associated with a module 1. The openings 76 of a same row are laterally delimited by portions 77 or plate 74, two adjacent openings 76 being in particular separated by a portion 77 of plate 74. Openings 76 allow the passage of one of guiding elements 32 associated with a module, metal strip 46 then coming into contact with portions 77 of plate 74. In the embodiment shown in FIG. 9, plate 74 is continued at one end by a connector 78 intended to form a terminal of the battery pack. Screw holes 80 may be provided in plate 74 to ease the assembly of plate 74 on guides 32.

Figure 10:
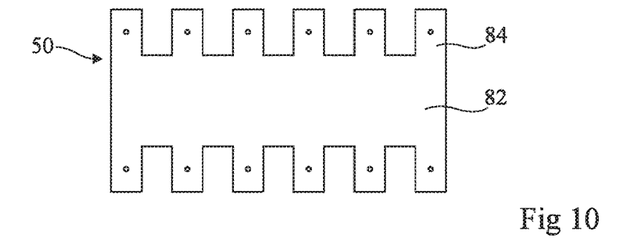

FIG. 10 shows another embodiment of a connection element 50 capable of connecting two modules 1 in series. Connection element 50 comprises a central portion 82 being continued on two sides by teeth 84, each tooth 84 being intended to be arranged in opening 54 of one of the guides 32 associated with the module. Screw holes may be provided in each protrusion 84 to ease the assembly of connection element 50 on guides 32.

Figure 11:
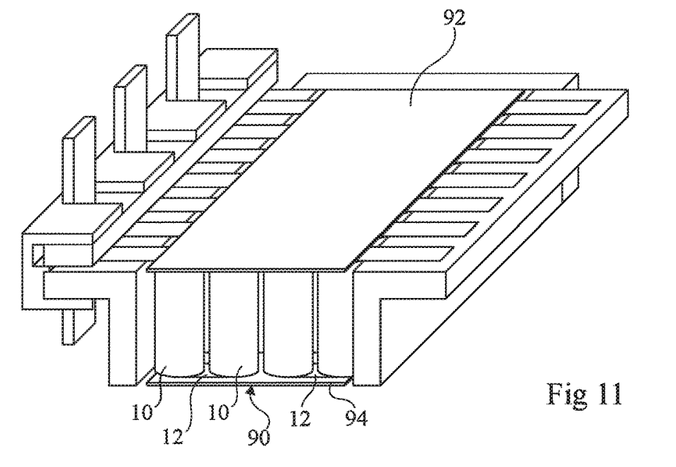
FIG. 11 is a perspective view of another embodiment of a battery pack.

FIG. 11 shows another embodiment of a module 90 showing printed circuits 92, 94 covering accumulators 10 on the side of each axial end of accumulators 10. Printed circuits 92, 94 are connected to each accumulator 10, to certain accumulators 10, to each connection part 12, and/or to certain connection parts 12. Printed circuits 92, 94 may be connected to electronic board 5. According to an embodiment, printed circuits 92, 94 correspond to a single flexible printed circuit which is folded to cover the two axial ends of each accumulator 10.

Figure 12:
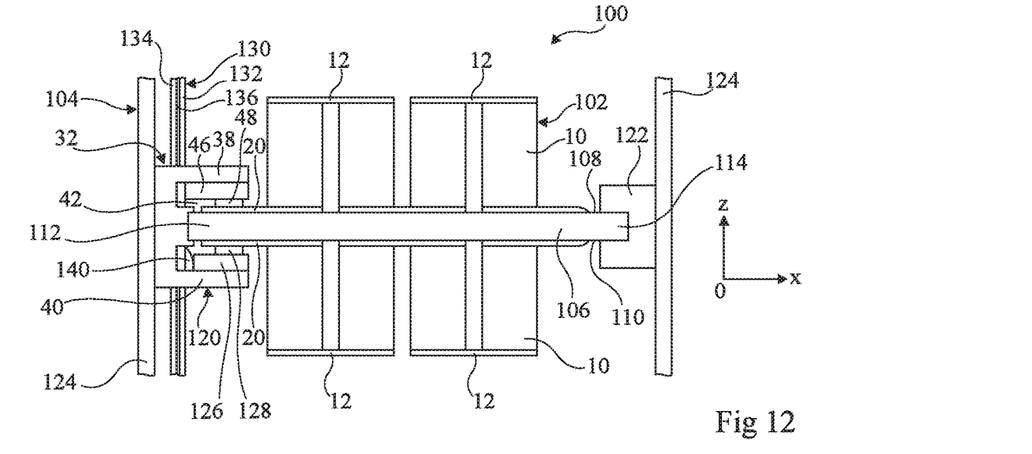
FIG. 12 is a view similar to FIG. 4 of a battery pack and of another embodiment of a module connection device.

FIG. 12 is a partial simplified perspective view of a battery pack 100 comprising another embodiment of a module 102 of a battery pack and another embodiment of a module connection device 104. The elements common with the embodiment shown in FIG. 3 are designated with the same reference numerals.

In this embodiment, the module 102 of a battery pack corresponds to the electric diagram shown in FIG. 1, M being equal to 8. Module 102 comprises a support 106 having two opposite surfaces 108 and 110 and two opposite lateral edges 112, 114. The accumulators 10 of module 102 are distributed on the two surfaces 108, 110 so that conductive strips 20 are located along a same lateral edge 112 of support 106. As an example, the conductive strips 20 located on surface 108 are connected to the positive terminals of the adjacent accumulators 10 and the conductive strips 20 located on surface 110 are connected to the negative terminals of the adjacent accumulators 10. The accumulators 10 on the side of surface 108 adjacent to lateral edge 114 are connected, by metal strips 12 crossing support 106, to accumulators 10 on the side of surface 110 adjacent to lateral edge 114.

Connection device 104 comprises one guiding and connection element 120 and one guiding element 122, each extending parallel to direction (Oy). Elements 120 and 122 are attached to a support frame 124.

Figure 13:
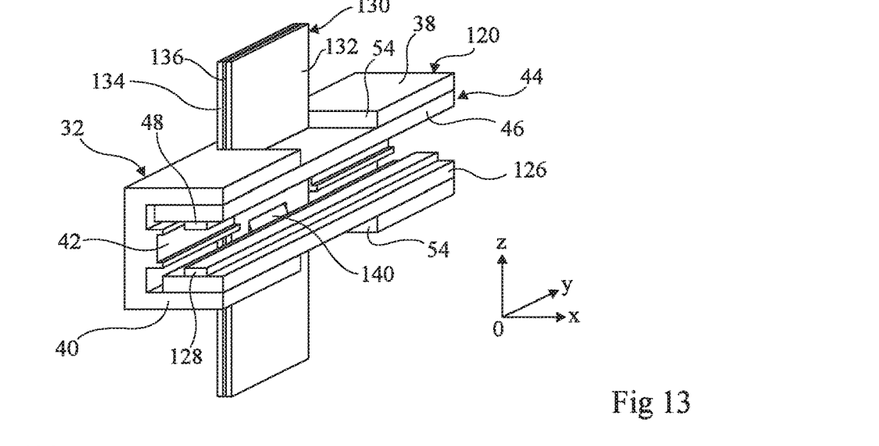
FIG. 13 is a view similar to FIG. 5 of a guide of the battery pack connection device shown in FIG. 12.

FIG. 13 is a partial simplified perspective view of guiding and connection element 120.

In operation, guiding and connection element 120 is intended to cooperate with a lateral edge 112 of support 106 and guiding element 122 is intended to cooperate with a lateral edge 114 of support 106.

Guiding and connection element 120 has the same structure as previously-described guiding and connection element 32, but for the fact that electric connection part 44 further comprises a metal strip 126 which may have the same structure as metal strip 46 and which extends parallel to direction (Oy) all along the length of guide 32. Metal strip 126 is located in groove 42 and is attached to lateral portion 40.

Electric connection part 44 further comprises flexible electric connectors 128, attached to metal strip 126, and which may have the same structure as flexible electric connectors 48.

Connectors 48 come into contact with conductive strips 20 located on surface 108 and connectors 128 come into contact with conductive strips 20 located on surface 110 when module 102 is fully inserted into guiding elements 120, 122.

Connection element 50 comprises metal portions 130, for example having the shape of strips, each extending parallel to direction (Oz). A single portion 130 is shown in FIGS. 12 and 13. Metal portions 130 play the same role as previously-described metal portions 52.

Figure 14:
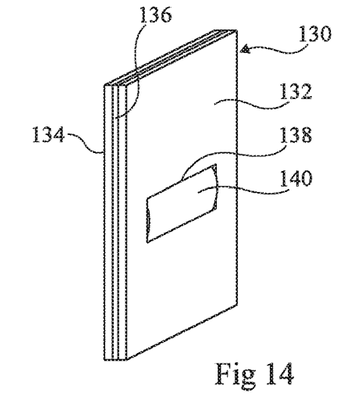
FIGS. 14 and 15 respectively are a perspective view and a side view of an element of the connection device of FIG. 12.
Figure 15:
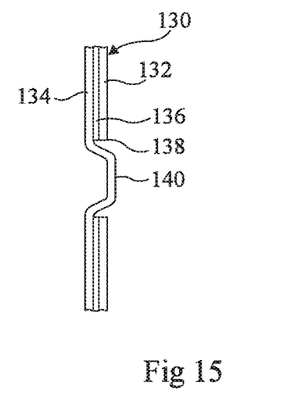

FIGS. 14 and 15 respectively are a perspective view and a cross-section view of an embodiment of a metal portion 130. The cross-section plane of FIG. 15 is a plane parallel to plane (Oxz) substantially running through the middle of metal portion 130. Each metal portion 130 comprises two metal layers 132, 134 separated by an insulating layer 136. An opening 138 is formed in metal layer 132 and insulating layer 136. Metal layer 134 comprises a convex area 140 which penetrates into opening 138 and which protrudes from metal layer 132.

Metal layer 132 is in electric contact with metal strip 46 and convex area 140 is in contact with metal strip 124. Preferably, the surface area of contact between the metal layer and metal strip 46 is substantially equal to the surface area of contact between convex area 140 and metal strip 124.

The embodiment of metal portion 130 shown in FIGS. 14 and 15 is particularly adapted to the case where modules 102 of a battery pack are connected in parallel.

Figure 16:
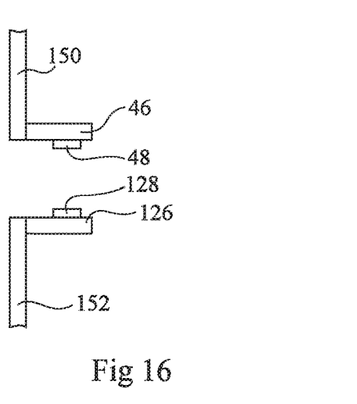
FIG. 16 is a partial simplified cross-section view of a variation of the connection device of FIG. 12.

FIG. 16 shows a variation where metal portion 130 is replaced with two metal plates 150 and 152. Metal plate 150 is in contact with metal strip 46 and metal plate 152 is in contact with metal strip 126. This variation is particularly adapted to the case where modules 102 of a battery pack are series-connected. As an example, when a first module 102 is arranged between second and third modules 102, plate 152 may be connected to metal strip 126 of first module 102 and to metal strip 46 of second module 102, and plate 150 may be connected to metal strip 46 of first module 102 and to metal strip 46 of third module 102.

Specific embodiments have been described. Various alterations and modifications will occur to those skilled in the art. Although in the previously-described embodiments, module 1 comprises two supports 14, each capable of cooperating with a guiding and connection element 32, the module accumulators may be connected to one another so that a single support 14 is provided along a row of accumulators.

What is claimed is:

1. A battery pack comprising:
a first plurality of accumulators distributed in rows;
a first support arranged along a first row of accumulators of the first plurality of accumulators;
first conductive strips attached to the accumulators of the first row and extending on the first support;
a first guide, the first support being capable of sliding in the first guide;
a first metal strip extending in the first guide;
first deformable electric connectors, interposed between the first metal strip and the first conductive strips, attached to the first metal strip and capable of coming into contact with the first conductive strips when the first support is fully inserted into the first guide;
first metal portions distributed along the first metal strip and in contact with the first metal strip;
second conductive strips attached to the accumulators of a second row of accumulators of the first plurality of accumulators;
a second metal strip;
second deformable electric connectors attached to the second metal strip and capable of coming into contact with the second conductive strips;
a second support arranged along the second row of accumulators, the second conductive strips extending on the second support;
a second guide, the second support being capable of sliding in the second guide, the second metal strip extending in the second guide, the second deformable electric connectors being capable of coming into contact with the second conductive strips when the second support is fully inserted into the second guide; and
second metal portions distributed along the second metal strip and in contact with the second metal strip.

2. The battery pack of claim 1, wherein, for each first conductive strip, the electric resistance between the first conductive strip and the first closest metal portion is substantially identical.

3. The battery pack of claim 2, wherein, for each first conductive strip, the electric resistance between the first conductive strip and the first closest metal portion is identical to within 10%.

4. The battery pack of claim 1, wherein the first deformable electric connectors comprise multiple-strip electric connectors.

5. The battery pack of claim 1, wherein the first guide comprises first openings for the passage of the first metal portions.

6. The battery pack of claim 1, comprising a plate continued by the first metal portions.

7. The battery pack of claim 1, wherein the first support comprises first and second opposite surfaces, the first row of accumulators being arranged on the first surface and the second row of accumulators being arranged on the second surface, the first conductive strips extending on the first surface and the second conductive strips extending on the second surface, the second metal strip extending in the first guide, the second deformable electric connectors being capable of coming into contact with the second conductive strips when the first support is fully inserted into the first guide, each first metal portion comprising a first metal layer in contact with the first metal strip and a second metal layer in contact with the second metal strip.

8. A battery pack comprising:
a first plurality of accumulators distributed in rows;

a first support arranged along a first row of accumulators of the first plurality of accumulators;

first conductive strips attached to the accumulators of the first row and extending on the first support;

a first guide, the first support being capable of sliding in the first guide;

a first metal strip extending in the first guide;

first deformable electric connectors, interposed between the first metal strip and the first conductive strips, attached to the first metal strip and capable of coming into contact with the first conductive strips when the first support is fully inserted into the first guide;

first metal portions distributed along the first metal strip and in contact with the first metal strip;

a second plurality of accumulators distributed in rows;

a third support arranged along a third row of accumulators of the second plurality of accumulators;

third conductive strips attached to the accumulators of the third row and extending on the third support;

a third guide, the third support being capable of sliding in the third guide;

a third metal strip extending in the third guide;

third deformable electric connectors attached to the third metal strip and capable of coming into contact with the third conductive strips when the third support is fully inserted into the third guide; and third metal portions distributed along the third metal strip and in contact with the third metal strip.

9. The battery pack of claim 8, wherein the first metal portions are connected to the third metal portions so that the resistance between each accumulator of the first row and the accumulator of same rank of the third row is identical to within 10%.

10. The battery pack of claim 8, further comprising:

a fourth support arranged along a fourth row of accumulators of the second plurality of accumulators;

fourth conductive strips attached to the accumulators of the fourth row and extending on the fourth support;

a fourth guide, the fourth support being capable of sliding in the fourth guide;

a fourth metal strip extending in the fourth guide;

fourth deformable electric connectors, interposed between the first metal strip and the first conductive strips, attached to the fourth metal strip and capable of coming into contact with the fourth conductive strips when the fourth support is fully inserted into the fourth guide; and fourth metal portions distributed along the fourth metal strip and in contact with the fourth metal strip.

11. The battery pack of claim 9 wherein the second portions are connected to the fourth metal portions so that the resistance between each accumulator of the second row and the accumulator of same rank of the fourth row is identical to within 10%.

\* \* \* \* \*